No. 862,822. PATENTED AUG. 6, 1907.
E. P. HOLMBERG.
ESTIMATING MACHINE.
APPLICATION FILED APR. 4, 1907.
2 SHEETS—SHEET 2.
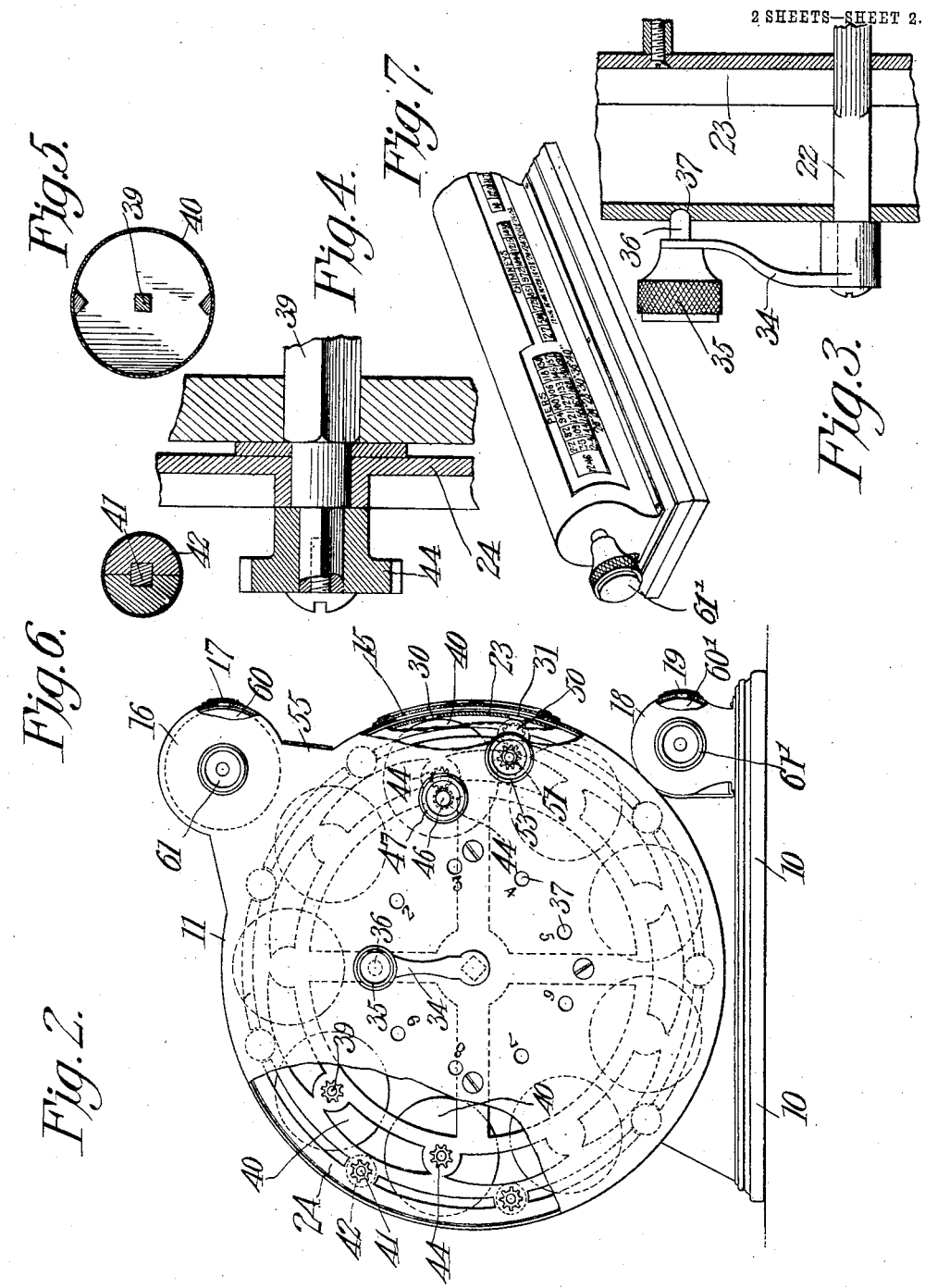

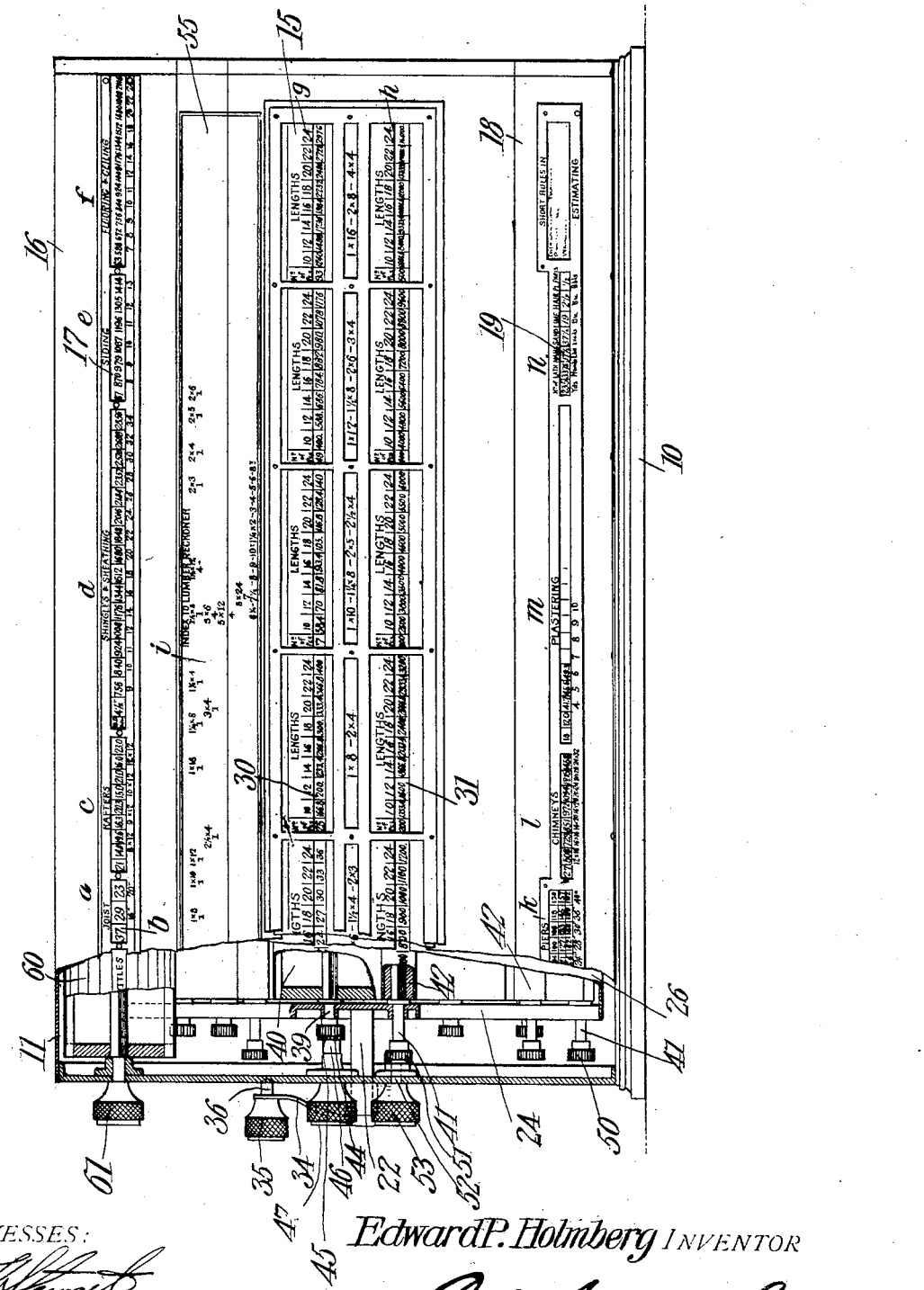

UNITED STATES PATENT OFFICE.

EDWARD PETER HOLMBERG, OF TAMPA, FLORIDA, ASSIGNOR OF ONE-HALF TO ARTHUR KIRKLAND, OF TAMPA, FLORIDA.

ESTIMATING-MACHINE.

No. 862,822.  Specification of Letters Patent.  Patented Aug. 6, 1907.

Application filed April 4, 1907. Serial No. 366,354.

*To all whom it may concern:*

Be it known that I, EDWARD PETER HOLMBERG, a citizen of the United States, residing at Tampa, in the county of Hillsboro and State of Florida, have invented a new and useful Estimating-Machine, of which the following is a specification.

The principal object of the present invention is to provide an apparatus of simple character for use by contractors, builders, and dealers in building supplies, and the like, for accurately calculating the amount of material necessary for the erection of various buildings, from rough specifications or plans, the device being provided with tables so arranged that the user may readily determine the amount of material, such as bricks, lumber, shingles, laths, nails, mortar and other materials necessary for the purpose intended.

A further object of the invention is to provide a device of this type in which a plurality of sets of related calculating tables are so arranged as to permit adjustment within a suitable casing or carrier to a position where any of them may be exposed to view so that the operator may move to proper position the table or tables which he is to use, while the others remain concealed in order to prevent confusion.

A still further object of the invention is to provide a device of this character in which movable carriers are provided with tables having a definite relation to each other, so that, for instance, the operator may first determine the number of pieces of lumber and the size of such pieces to be used, and then by referring to a related table may determine the amount of lumber by feet in all of the pieces, or through other tables may determine the number of bricks necessary, or the number of square yards of plastering, together with the number of laths necessary for plastering, and the quantity of material to be used in manufacturing the plaster.

With these and other objects in view, as will more fully hereinafter appear, the invention consists in certain novel features of construction and arrangements of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a front elevation of an estimating machine constructed in accordance with the invention, one end of the machine being broken away in order to more clearly illustrate the construction. Fig. 2 is an end view of the same, partly in section. Fig. 3 is a sectional detail showing the mounting of the main drum. Fig. 4 is a similar view showing the mounting of one of the smaller drums.

Figs. 5 and 6 are detail cross sections of one of the intermediate and one of the minor drums respectively. Fig. 7 is a detail perspective view showing that portion of the machine employed for determining the quantity of bricks, plaster, laths, etc. to be used in the construction of a building.

Similar numerals of reference are employed to indicate corresponding parts throughout the several figures of the drawings.

The machine is mounted on a base 10 and includes a generally cylindrical casing 11, the longitudinal axis of which is disposed in a horizontal plane, and in front of the casing is a large display opening 15, that is preferably covered by transparent panels. The upper portion of the casing is provided with a cylindrical extension 16, hereinafter referred to, and in front of this portion of the casing is a display opening 17, while at the base is an auxiliary casing 18 having a display opening 19, all of these display openings being so arranged at the several tables that the movable members within the casing may be readily examined. The opposite heads of the cylindrical casing 11 are provided with bearing openings for the reception of a shaft 22, on which is mounted a drum 23. This drum includes a pair of end members 24 having circular peripheries to which is attached a cylinder 26 bearing tables, more particularly hereinafter referred to, there being nine of such tables in the present instance, and all of the tables being provided with two elongated slots 30, 31, through which auxiliary tables within the drum may be examined. The width of each of the tables is approximately equal to the vertical height of the display openings 15, so that the whole of the table is in view at the same time.

One end of the shaft 22 projects beyond the head of the cylindrical casing, and is provided with an elastic arm 34 having a knob or handle 35 from which projects a small detent 36 adapted to engage in any one of a series of depressions or notches 37 that are formed in the head of the casing. This permits turning of the drum 23 to any desired position and when the detent is entered in any one of the notches, the drum is locked with the selected table in alinement with the display opening 15. By preference the recesses or notches 37 are provided with numerals which bear a certain relation with the tables and index on the front of the casing, so that by referring to the index the operator is enabled to bring the desired table of the drum to position for examination.

Journaled in the end frames of the main drum are shafts 39 carrying drums 40, there being nine of such drums in the present instance, and the end drums are, also, provided with bearings for shafts 41, carrying smaller drums 42, also nine in number. These drums bear tables that have a certain predetermined relation with the tables of the main drum, and their surfaces are exposed through the openings 30 and 31, respectively.

On one end of each shaft 39 is a pinion 44 which may be brought into mesh with a pinion 45 that is arranged at the inner end of a small shaft 46 journaled in the head of the casing, and at the outer end of this shaft 46 is a knob 47 which may be turned for the purpose of revolubly adjusting the drum 40 and presenting any portion of its surface into alinement with the display opening 30 of the main drum.

On the end of each shaft 41 is a small pinion 50 which intermeshes with a pinion 51 on the end of a short shaft 52 that is journaled in the head of the casing, and at the outer end of shaft 52 is secured a knob 53 which may be turned for the purpose of revolving the adjusting drum 42 and presenting any portion of the surface of the latter into alinement with the display opening 31 of the main drum.

On the front of the casing is a panel 55 which forms an index by which the operator determines the extent of movement to be imparted to the main drum, that is to say, reference to the index will point out the number of the notch or recess 37 into which the detent 36 is to be adjusted to bring the proper portion of the main drum and the proper drums 40 and 42 to display position, and when brought to this position the smaller drums 40 and 42 may be independently adjusted so that the several tables or portions of tables carried thereby may be displayed at the openings 30, 31, and in proper relative position to the table or portions of table carried by the main drum, so that the operator may determine from a comparison of the two tables or portions of tables, the desired result, this in the present instance being the amount of lumber in feet required in the erection of a building of a predetermined size.

The auxiliary cylindrical casing 16 contains a drum 60 the carrying shaft of which extends through the end of the casing and is provided with a knob 61, so that said drum may be revolubly adjusted and present any portion of its surface into alinement with the display opening 17. This drum carries tables for indicating the quantity of material or number of pieces to be used in the erection of the building. For instance, on section $a$ are numerals $b$ arranged in consecutive order and indicating lengths in feet of a building, numeral 37 at present displayed showing that the building for which the calculation is to be made is thirty-seven feet long, and this portion of the table is used to determine the number of joists to be used if the building is one story high. If the joists are to be spaced at sixteen inch intervals, it will be necessary to use twenty-nine joists, or if they are to be spaced at twenty inch intervals it will be necessary to use twenty-three joists. The operator knowing the length of the building and the distance which the joists are to be spaced can then readily determine the number of joists which he must purchase.

The section $c$ of the table indicates the length of rafters to be used at different pitches. Thus if the building is twenty-one feet wide with a rafter on an eight by twelve pitch, the ordinary rafters will be fourteen feet in length and the hip rafters will be nineteen feet six inches in length. If on a nine by twelve pitch, the ordinary rafters will be fourteen feet three inches in diameter, and the hip rafters twenty feet three inches. If on a ten by twelve pitch, the ordinary rafters will be fifteen feet in length and the hip rafters twenty-one feet. If on a twelve by twelve pitch, that is with the rafters at an angle of forty-five degrees, the ordinary rafters will be sixteen feet in length and the hip rafters twenty-three feet. The number of rafters is always determined, in ordinary house construction, by dividing the length of the house by two, so that the operator knowing the number of rafters and the pitch, can readily ascertain the lengths of such rafters.

The section $d$ is to indicate the number of shingles, or the feet of sheathing necessary. For instance, if the rafters are ten feet in length, and the building is twenty feet long, the shingles if exposed four and one-half inches, it will require sixteen hundred and eighty shingles for the roof. If there is a five inch exposure, it is necessary only to use fifteen hundred shingles. If there is a five and one-half inch exposure, it is necessary to use thirteen hundred and eighty shingles. If sheathing is used, one hundred feet will be necessary.

The section $e$ is for the calculation of the amount of lumber to be used in a siding. In the first place it is necessary to know the length of all of the walls of the building. If this length is eighty-seven feet and the building is ten feet in height, it will be necessary to use ten hundred and eighty-seven feet of siding, the additional lumber which it is obvious this calculation gives, being that which is ordinarily allowed for waste. If the building is two stories, one of ten feet and another nine feet, the operator merely adds the two sums ten hundred and eighty-seven and nine hundred and seventy-nine together.

For flooring and ceiling, the table $f$ is used. The length of the building is first ascertained, and it is supposed in the present instance to be sixty-three feet. If the building is ten feet wide, it will be necessary to use eight hundred and forty feet of lumber to cover the entire floor, or the entire ceiling, and if there are a number of floors, this sum is multiplied by two or three, in accordance with the floors.

Each of the separate tables that are carried by the large drum has sets of divisions $g$ and $h$ which indicate lengths in feet of the joists, rafters, etc., and in the present instance these appear as ten, twelve, fourteen, sixteen, eighteen, twenty, twenty-two, and twenty-four, and at the left of each table is an abbreviation "No. of pcs." Before the two length indicating graduations is a table for indicating the cross sectional area of the lumber, and taking the most simple form as an example we have lumber "one by twelve", "one and one-half by eight", "two by six", "three by four". The sum of each of these indicates twelve inches, and all material one inch thick on which the mechanism is calculated indicates one foot of lumber.

The different tables are arranged to cover all possible or ordinary cross sections of lumber, and one of the tables of the large drum will carry say sixteen or eighteen or more sets of numerals indicating such cross sectional areas, there being on all of the tables some two hundred and thirty-seven different sets of figures.

It is desirable that the proper set of figures all appear opposite the main display opening in the casing, and for this purpose an index $i$ is employed on the front panel of the casing. This index shows that the one by twelve table is movable to display position by adjusting the table into the recess 1, likewise the one and one-half by eight table and the two by six table, and the three by four table, so that knowing the cross sectional area of the lumber which he is to use, the operator refers to the index, and the index refers him to the stop to be made in order to bring the desired table opposite the display opening. This being accomplished, the two small drums 40 and 42 are arranged in position to be adjusted relatively to the table displayed, and to expose portions of the tables which they bear to the openings 30 and 31. The length of the larger drum 40 is divided into tables of a number corresponding to those found in the width of the main drum, and at the right of each of these is a row of numerals, the numerals in this instance extending from one to ninety-nine inclusive. The operator knowing, for instance, the number of joists which he is to use or the number of rafters, and the length of such rafters, turns the drum 40 until it is opposite the desired number, forty-nine for instance, or if instead the operator wishes to ascertain the number of feet of lumber in forty-nine pieces of timber one by twelve, one and one-half by eight, two by six, or three by four in cross section. If the lengths of these pieces be ten feet, he will see that there are four hundred and ninety feet of lumber in the lot, or if, for instance, there are twenty-five pieces of one by eight lumber, each twenty feet in length he will see that there is one hunrded and sixty feet eight inches board measure in the load. This shows the relation of the upper tables $a$ and $b$ to the lower tables, the operator first ascertaining, for instance, the number of joists and knowing the length of such joists by the width of the building and the cross section joists that he is to use, he can adjust the tables in order to readily ascertain the number of feet of lumber to be bought, and in similar manner the rafters and other pieces of timber.

The lowermost and small drum 42 simply bears numerals from one hundred to one thousand, and the proper multiples thereof, so that, for instance, if there are four hundred pieces of one by twelve timber each ten feet in length, the operator is informed that it constitutes four thousand feet of lumber, or if there be four hundred and forty-nine, each ten feet in length, the two sums are united together, indicating four thousand, four hundred and ninety feet of lumber.

One of the tables is so arranged in connection with its accompanying smaller drums as to indicate the number of linear feet for flooring and the like where the area is known, such, for instance, as the number of linear feet in two and one-half inch, three inch and three and one-half inch matched boards or the like, or of siding, ceiling, wainscoting or other lumber.

The lower casing 18 contains a drum 60′, the shaft of the drum projecting through one end of a casing and being provided with a turning knob 61′. On this drum are a number of tables indicating brick and plastering measurement.

The table $k$ is intended to show the number of bricks to be used in piers of different size, and at the left of the table are numerals indicating the size of the pier, the numerals exposed in the present instance being twelve by sixteen and indicating a pier sixteen inches long and twelve inches wide. On the casing beneath the display opening are numerals twenty, twenty-four, twenty-eight, thirty-six, and forty, indicating the height of the piers. If a pier twenty-eight inches high having an area of twelve by sixteen inches is to be constructed, it will require one hundred bricks if there are two two-inch insets. If there are three two-inch insets, one hundred and twenty-seven bricks will be required, and if four two-inch insets are used, one hundred and sixty-two bricks will be required. The table $l$ indicates the number of bricks in chimneys of different size. The numeral exposed, twenty-seven, shows a chimney of twenty-seven feet in height, is to be constructed. If the chimney is sixteen to twenty-eight inches in size it will require nine hundred and seventy-two bricks. If it is sixteen by twenty, it will require eight hundred and twenty-one bricks, etc.

The next table $m$ is for indicating the number of square yards of plaster in a room, and in this instance the numeral ten exposed at the opening indicates the length of the room. The next numeral nine indicates the height of the room. The remaining numerals running consecutively from four to twenty-four indicate the width of the room, this latter numeral being arranged on the casing. If a room is ten feet long, ten feet wide, and of a height of nine feet, there will be fifty-one and one-twelfth yards of plastering for the four walls and ceiling, and other measurements are indicated in proportion.

The next table $n$ is for indicating the quantities of material necessary for certain yards of plastering. The numeral exposed shows that there are two hundred and thirty-five square yards of plastering. For this purpose it will require three thousand, three hundred and fifty-seven laths, seventeen and one-half pounds of nails, thirty-seven and one-half bushels sand, nineteen bushels lime, two and one-half bushels of hair and one-half barrel of plaster of paris. The remaining tables are all of like proportion, and by turning the drum, the operator may readily ascertain what materials are necessary for any particular job.

The device is of practical value for small contractors, builders, carpenters and lumber dealers in that it avoids the necessity of calculating different amounts of material from the plans or specifications, and permits accurate estimating.

I claim:—

1. In a machine of the class described, a casing having a display opening, a drum arranged within the casing and provided with a plurality of sets of tables movable into alinement with said opening, a series of smaller drums journaled within the larger drum and rotatable therewith, and means for revolving the smaller drums independently of the larger drum and of each other, the larger drum having a display opening for exposing the surfaces of the smaller drums, and the display opening of the casing being of sufficient size to display portions of the tables carried by the larger drum and by one of the smaller drums at the same time.

2. In a device of the class specified, a casing having a display opening, a large drum mounted in the casing and bearing a series of tables which may be moved into alinement with the opening, a pair of sets of smaller drums journaled within the larger drum and also bearing tables having a definite relation to those of the larger drum, said smaller drums being revoluble with the larger drum, and the larger drum having display openings through which the tables of the smaller drums may be exposed, the smaller drums being revoluble independently of the larger drum, and of each other, and the display opening of the casing being of sufficient size to expose at the same time portions of the tables carried by the larger drum and portions of the tables carried by the smaller drums.

3. In a device of the class specified, a cylindrical casing having a display opening, a shaft extending through the casing, a drum mounted upon the shaft and provided with end members, the cylindrical portion bearing a series of tables that are movable into alinement with the display opening, a pair of sets of table bearing drums journaled in said end frames and revoluble therewith and independently thereof, the cylindrical portion of the larger drum having openings through which the tables of the smaller drums may be examined, pinions carried by the shafts of the smaller drums, shafts extending through the end walls of the casing, and having at one end pinions for engaging those of the drums, said shafts having manually operable knobs at their outer ends to permit independent revoluble adjustment of the drums.

4. In a device of the class specified, a casing having a display opening, one end of the casing being provided with a plurality of notches arranged in an annular series, a shaft extending through the casing, a drum mounted on the shaft and provided with a series of tables, a flexible operating handle secured to the shaft and provided with members arranged to enter anyone of the notches or recesses, a plurality of sets of smaller drums journaled within the larger drum and also bearing tables that are revoluble independent of the larger drum, said larger drum having display opening through which the tables of the smaller drums may be exposed.

5. In a device of the class specified, a casing, a plurality of sets of adjustable tables arranged within said casing, one of said tables being provided with numerals arranged in predetermined order for determining the number of pieces of lumber or the like necessary for the erection of a building, means for adjusting and locking the secondary tables, such secondary tables being provided with numerals indicating the number of feet of lumber in the quantity which forms the product of the first set of tables, the secondary tables being divided into sets, and an index based on the cross sectional area of the timber to be used and indicating the sets of tables of the secondary series on which the corresponding calculations are marked.

In testimony that I claim the foregoing as my own, I have hereto affixed my signature in the presence of two witnesses.

EDWARD PETER HOLMBERG.

Witnesses:
N. B. MILLAR,
V. C. CLEMENT.